United States Patent
Lee et al.

(10) Patent No.: US 7,077,542 B2
(45) Date of Patent: Jul. 18, 2006

(54) BACKLIGHT ASSEMBLY AND LIQUID CRYSTAL DISPLAY DEVICE USING THE SAME

(75) Inventors: Keun-Woo Lee, Gyeonggi-do (KR); Jong-Dae Park, Seoul (KR); Chang-Young Bang, Suwon-si (KR); Tae-Jin Lee, Suwon-si (KR); Jae-Sang Lee, Seoul (KR); Jeong-Hwan Lee, Suwon-si (KR); Jae-Ho Jung, Yongin-si (KR); Yong-Seok Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 135 days.

(21) Appl. No.: 10/452,093

(22) Filed: May 30, 2003

(65) Prior Publication Data
US 2004/0008524 A1    Jan. 15, 2004

(30) Foreign Application Priority Data
Jul. 3, 2002    (KR)    ............................... 2002-38472

(51) Int. Cl.
*F21S 3/00*    (2006.01)

(52) U.S. Cl. ...................... 362/224; 362/309; 362/329; 362/561

(58) Field of Classification Search ................. 362/27, 362/31, 561, 309, 310, 311, 217, 224, 329, 362/330, 331
See application file for complete search history.

(56) References Cited

U.S. PATENT DOCUMENTS 5,034,864 A * 7/1991 Oe .............................. 362/224

* cited by examiner

*Primary Examiner*—John Anthony Ward
(74) *Attorney, Agent, or Firm*—Cantor Colburn LLP

(57) ABSTRACT

Disclosed are a backlight assembly and a liquid crystal display device using the same. A ratio of a pitch, which is an interval between the lamps for supplying light to an LCD panel, to a gap, which is a distance between the center of the lamps and an optical plate, is adjusted to thereby minimize the bright line that badly influences the image display quality, so as to display a high quality image.

17 Claims, 10 Drawing Sheets

BACKLIGHT ASSEMBLY AND LIQUID CRYSTAL DISPLAY DEVICE USING THE SAME

BACKGROUND OF THE INVENTION

1. Field of the Invention

The disclosure relates to a backlight assembly and a liquid crystal display device using the same, and more particularly to a backlight assembly and a liquid crystal display device using the same in which bright lines generated from lamps arranged in parallel are prevented, while its volume and thickness are minimized and brightness is maximized.

2. Description of the Related Art

Generally, a liquid crystal display (LCD) device displays images using liquid crystal. Liquid crystal converts light that does not contain information into light containing information to display images. The LCD device includes a liquid crystal (LC) control part for precisely controlling the liquid crystal and a light supply part for supplying light to the LC control part.

In particular, the light supply part greatly influences the display quality of the LCD device. Specifically, the light supply part influences display brightness, power consumption, and thickness and volume of the LCD device.

Recently, the size of an LC control part considerably increases as the display area of an LCD device becomes larger. As a result, the amount of the light that is supplied from the light supply part to the LC control part also increases.

Recently, there has been a development in the structure of an LCD device in which a plurality of light sources, for instance, cold cathode fluorescent lamps, are arranged in parallel below the LC control part in order to supply enough light to the increased area of the LC control part. The structure in which a plurality of light sources are arranged in parallel below the LC control part is called "direct-illuminating type LCD device".

A conventional direct-illuminating type LCD device has an advantage in that a sufficient amount of light can be supplied to the LC control part. However, the conventional direct-illuminating type LCD device also has disadvantages in that the brightness becomes non-uniform and the thickness and volume of the LCD device increase.

In order to prevent the display quality from being deteriorated due to the non-uniform brightness, the conventional direct-illuminating type LCD device utilizes a light diffusion plate for diffusing the light generated from the light source.

However, even though the light diffusion plate is used, the conventional direct-illuminating type LCD device still has the drawback in that bright lines generated from the lamps are shown from the outside of the light diffusion plate depending upon a pitch and a gap. The pitch is a distance between light sources (lamps), and the gap is a distance between the light sources and the light diffusion plate.

Specifically, if the gap between the light sources and the light diffusion plate increases while the pitch between the light sources is fixed at a constant value in order to eliminate the bright lines, the brightness decreases abruptly, so that the display quality is seriously lowered. In this case, the thickness and the volume of the direct-illuminating type LCD device increase.

On the contrary, if the gap decreases while the pitch is fixed at a constant value, the problem due to brightness is solved, but bright lines are shown and are perceived by a user, so that display failure occurs.

Also, if the pitch increases while the gap is fixed at a constant value, the brightness that influences display quality is largely lowered, so that the display quality is lowered.

On the contrary, if the pitch decreases while the gap is fixed at a constant value, the brightness is largely enhanced, but the number of the bright lines increases and power consumption increases.

SUMMARY OF THE INVENTION

The present invention provides a backlight assembly having an optimized ratio of the pitch to the gap such that brightness, power consumption, thickness and volume are optimized, thereby realizing a high quality display.

The present invention also provides an LCD device capable of realizing a high quality display using a backlight assembly having an optimized ratio of the pitch to the gap such that brightness, power consumption, thickness and volume are optimized.

In one aspect of the invention, there is provided a backlight assembly comprising a receiving container, at least two lamps disposed in the receiving container, and an optical plate for enhancing brightness uniformity of light generated from the lamps, wherein the backlight assembly has a bright line prevention ratio of a pitch to a gap, the ratio being ranged from about 1.3 to about 2.0 so as to prevent a bright line generated from the lamps from being perceived outside the optical plate, the pitch being a distance between centers of two adjacent lamps, the gap being a distance between a center of the respective lamps and a surface of the optical plate, and the surface being opposite to the lamps.

In another aspect of the present invention, there is provided a liquid crystal display device comprising a backlight assembly including: a receiving container; at least two lamps disposed in the receiving container, for generating a first light; and an optical plate being apart from centers of the lamps, for diffusing the first light to generate a second light having a uniform brightness distribution, wherein the backlight assembly has a bright line prevention ratio of a pitch to a gap in the range from about 1.3 to about 2.8 so as to prevent a bright line of the first light from being perceived outside the optical plate, the pitch is a distance between centers of two adjacent lamps, the gap is a distance between a center of the respective lamps and a surface of the optical plate, and the surface is opposite to the lamps. The liquid crystal display device also includes a liquid crystal display panel assembly received in the receiving container, for displaying images using a second light diffused by the optical plate; and a chassis for fixing the liquid crystal display panel assembly to the receiving container.

According to the present invention, the pitch and the gap are precisely controlled to minimize thickness and volume of the backlight assembly, to allow the bright line of the lamp not to be shown, and to provide optimized brightness.

BRIEF DESCRIPTION OF THE DRAWINGS

The objects and advantages of the present invention will become more apparent by describing in detail the preferred embodiments thereof with reference to the accompanying drawings, in which.

DETAILED DESCRIPTION OF THE PREFERRED EMBODIMENTS

Hereinafter, described in detail are a light guiding plate, a method for manufacturing the light guiding plate and an LCD device provided with the light guiding plate with reference to the accompanying drawings.

Figure 1:
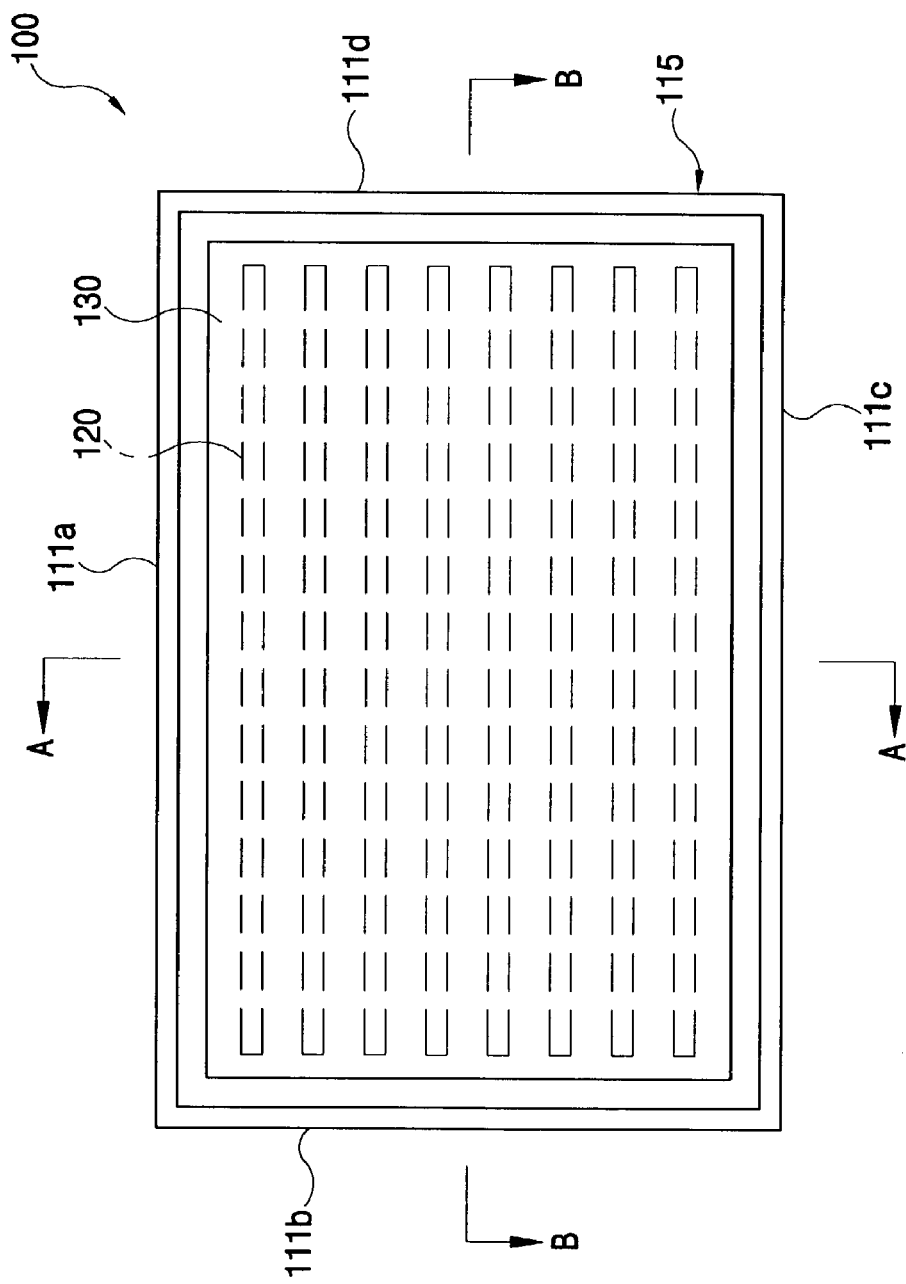
FIG. 1 is a plan view of a backlight assembly according to a first embodiment of the present invention.
Figure 2:
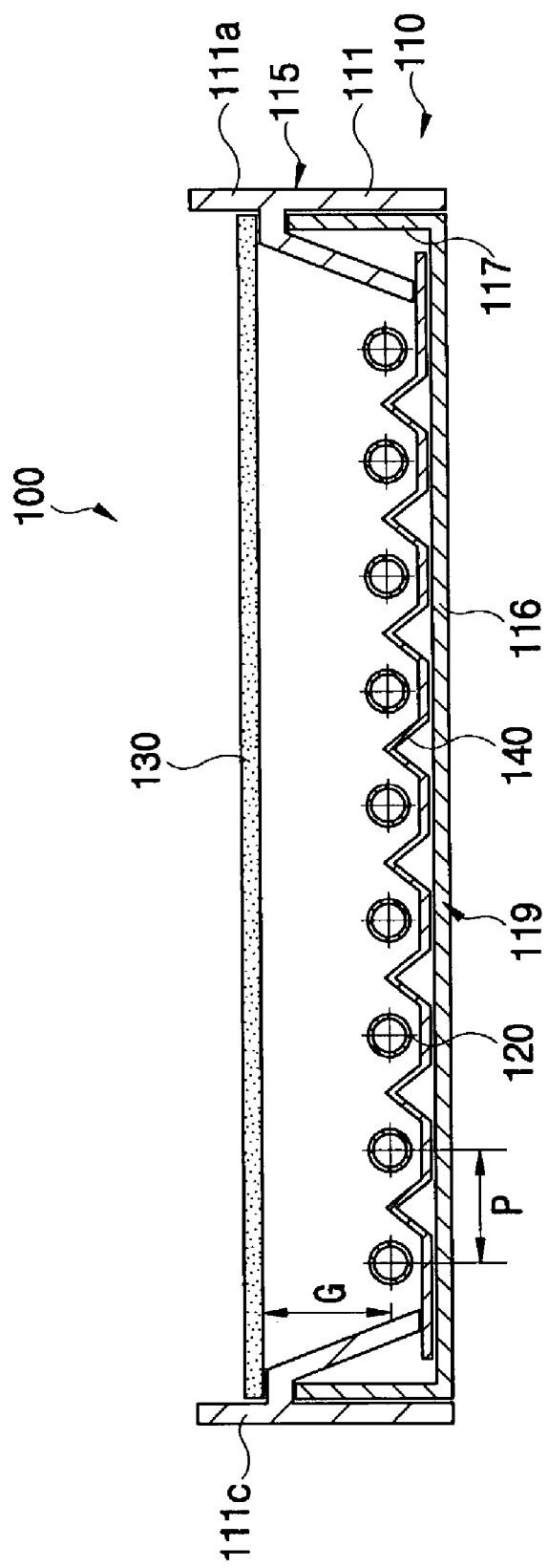
FIG. 2 is a sectional view taken along the line A—A of FIG. 1.

FIG. 1 is a plan view of a backlight assembly according to a first embodiment of the present invention, and FIG. 2 is a sectional view taken along line A—A of FIG. 1.

Referring to FIG. 2, a backlight assembly 100 includes a receiving container 110, a plurality of lamps 120, and an optical plate 130. The reference numeral 140 represents a reflection plate. The reflection plate 140 is installed in the receiving container 1 10, and reflects the light generated from the lamps 120 toward the optical plate 130.

The receiving container 1 10 also includes a receiving frame 115 and a bottom chassis 119.

Referring to FIG. 1, the receiving frame 115 is comprised of four sidewalls 111a, 111b, 111c, 111d connected with each other. Ends of the lamps 120 are connected to sidewalls 111b and 111d of the receiving frame 115.

The bottom chassis 119 is comprised of a rectangular bottom plate 116 and a bottom chassis sidewall 117 extended from edges of the bottom plate 116.

Figure 3:
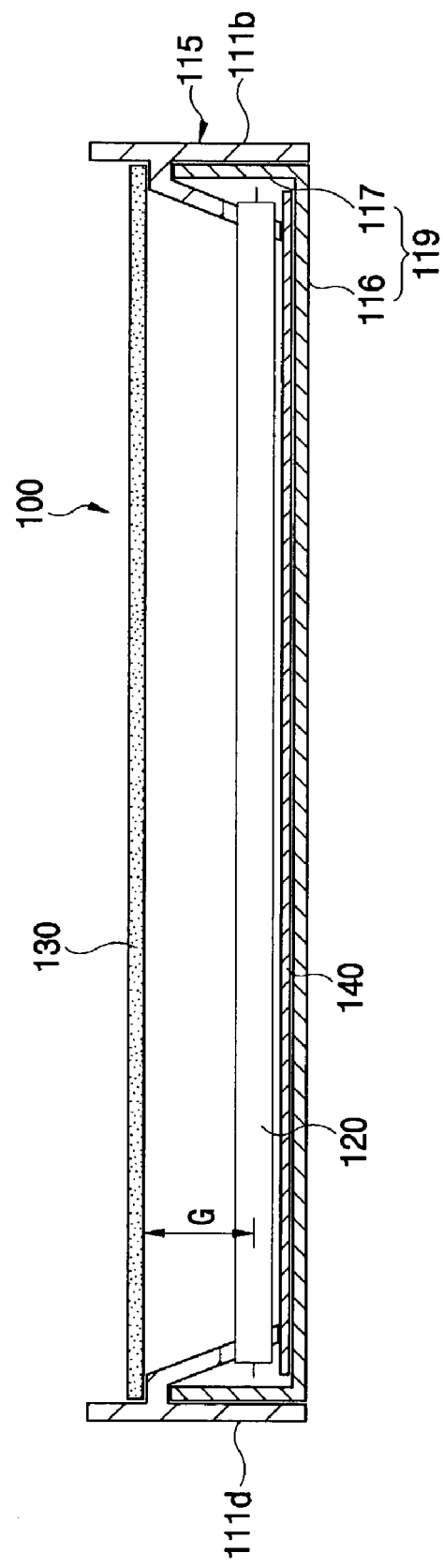
FIG. 3 is a sectional view taken along the line B—B of FIG. 1.

FIG. 3 is a sectional view taken along line B—B of FIG. 1.

Referring to FIG. 3, the lamps 120 are arranged in parallel between, for example, sidewalls 111b and 111d of the receiving frame 115, and sidewalls 111b and 111d face to each other.

The lamps 120 are arranged in the receiving frame 115, and inner surfaces of the respective sidewalls 111a, 111b, 111c, 111d of the receiving frame 115 are coupled to outer surfaces of the bottom chassis sidewall 117.

For instance, the receiving frame 115 and the bottom chassis 119 are hook-coupled. Specifically, at least one hook (not shown) is formed in the receiving frame 115, and at least one hook-coupling hole (not shown) to be coupled with the hook is formed in the bottom chassis 119.

The reflection plate 140 is installed between the lamps 120 and the bottom plate 116 of the bottom chassis 119 to reflect a part of the light generated from the lamps 120 toward the optical plate 130.

The optical plate 130 also enhances the uniformity in the brightness of the light generated from the lamps 120. For the enhancement of the uniformity, the optical plate 130 is mounted on the sidewalls 111a, 111b, 111c, 111d of the receiving frame 115, and fixed thereto. For example, the optical plate 130 may have the light transmissivity of approximately 35–65%. More specifically, the optical plate 130 may have the light transmissivity of approximately 41%, approximately 49%, or approximately 59%.

In the backlight assembly 100 according to the first embodiment of the present invention, the pitch (P) of the lamps 120 and the gap (G) between the center of the lamps 120 and the lower surface of the optical plate 130 may be measured. Hereinafter, the "pitch" is defined as an interval between the centers of adjacent two lamps, and the "gap" is defined as an interval between the center of the lamps 120 and the lower surface of the optical plate 130. In this embodiment, it is assumed that the diameters of the lamps 120 arranged in the receiving container 110 are substantially the same, and heights of the lamps are substantially the same.

Referring to FIG. 2, depending upon the pitch (P) of the lamps 120 and the gap (G) between the center of the respective lamps 120 and the lower surface of the optical plate 130, the bright line of the lamps 120 may be perceived or not perceived outside the optical plate 130.

When the bright line of the lamps 120 is perceived outside the optical plate 130, an image adjacent to the bright line generated by the lamps 120 is displayed very bright, but an image between the bright lines generated by the lamps 120 is displayed relatively dark. These bright lines lower the quality of image display.

In order to prevent the display quality from being lowered due to the existence of the bright line, the pitch (P) and the gap (G) may be changed and calculated to have their optimum values. As aforementioned, the pitch (P), the gap (G) and the transmissivity of the optical plate 130 are factors to be considered in generation of the bright line.

Hereinafter, there will be described various embodiments for the backlight assembly in which the pitch (P), the gap (G) and the transmissivity of the optical plate 130 are precisely controlled such that the bright line of the lamps 120 is not shown, while minimizing power consumption, thickness and volume of the backlight assembly and maximizing brightness of the backlight assembly.

Hereinafter, in the evaluation of bright line, symbol "x" means that image display is possible but a bright line is perceived by a user, symbol "Δ" means that image display is possible and a bright line is perceived weaker than in the case of symbol "x", symbol "●" means that most of bright lines are removed when forming a light diffusion pattern on the optical plate, and symbol "◎" means that no bright line is perceived.

Table 1 shows results of the bright line evaluation and brightness varying depending on the pitch (P) and the gap (G) when only the optical plate 130 is installed in the receiving container of the backlight assembly shown in FIG. 2.

TABLE 1

| Trans-missivity | Constitution Of Sheet | Pitch (mm) | Gap (mm) | Pitch/Gap | Evaluation Of Bright line | Brightness (cd/m$^2$) |
| --- | --- | --- | --- | --- | --- | --- |
| 49% | Optical plate | 13 | 4.7 | 2.8 | x | 7718 |
| | | 13 | 5.7 | 2.3 | Δ | 7679 |
| | | 13 | 6.7 | 1.9 | ● | 7370 |
| | | 13 | 7.7 | 1.7 | ● | 7126 |

In table 1, the pitch between the lamps 120 of the backlight assembly is approximately 13 mm as a constant value. The pitch (P) is defined as an interval between the center of two adjacent lamps, and the gap (G) is defined as a vertical distance between the center of a lamp and the lower surface of the optical plate 130. The optical plate 130 having a transmissivity of 49% was used for the experiment, and the gap was gradually increased by 1 mm, e.g., 4.7 mm, 5,7 mm, 6.7 mm, and 7.7 mm for the measurement.

As the gap increases, the brightness is gradually decreased and the bright line is also gradually decreased as shown in the bright line evaluation of table 1.

The decrease of the brightness in accordance with the increase of the gap (G) is because the intensity (luminance) of the light varies inversely proportional to the square value of the gap.

On the contrary, according as the gap increases, the intensity of bright lines that badly affect the image display is weakened. This is because the area on the optical plate 130, onto which the light from the lamps is irradiated, increases according as the gap increases.

Accordingly, by adjusting the gap while the pitch of the lamps is constantly maintained, the bright line badly affecting the image display can be minimized.

Hereinafter, the ratio of the pitch of the lamps to the gap between the lamps and the plate is defined as a bright line prevention ratio.

According to table 1, when the bright line prevention ratio is at least 2.0, the bright line is weak enough to display images. By precisely adjusting the bright line prevention ratio, it is possible to minimize an overall thickness of the backlight assembly while the bright line is not shown.

For example, the bright line prevention ratio is preferably set in the range from about 1.8 to about 1.7 in order to maintain high image display quality, to minimize the thickness of the backlight assembly, and to obtain desired brightness.

Even if the bright line prevention ratio is set less than about 1.7, the bright line is not shown. However, according as the bright line prevention ratio is lowered, the gap increases largely and thickness and volume of the backlight assembly increases. Thus, it is desirable that the bright line prevention ratio is at least about 1.3.

In addition, the brightness is so important for LCD devices that when the brightness is too low, the display quality of images is significantly lowered.

Table 1 shows the evaluation of the bright line and the measured results of the brightness in the case of employing one sheet of the optical plate.

Table 2 below shows that at least one optical sheet, preferably two optical sheets, for enhancing the brightness are added to one sheet of the optical plate, so that the thickness of the backlight assembly is minimized, the brightness is enhanced, and the bright line is not shown.

TABLE 2

| Trans-missivity | Constitution Of Sheet | Pitch (mm) | Gap (mm) | Pitch/ Gap | Evaluation Of Bright line | Brightness (cd/m$^2$) |
|---|---|---|---|---|---|---|
| 49% | Optical Plate + two optical sheets | 13 13 13 13 | 4.7 5.7 6.7 7.7 | 2.8 2.3 1.9 1.7 | x ● ● ◉ | 10047 10012 9909 9320 |

The "optical sheet" is a diffusion sheet for enhancing the brightness of the light and uniformity in the brightness.

Figure 4:
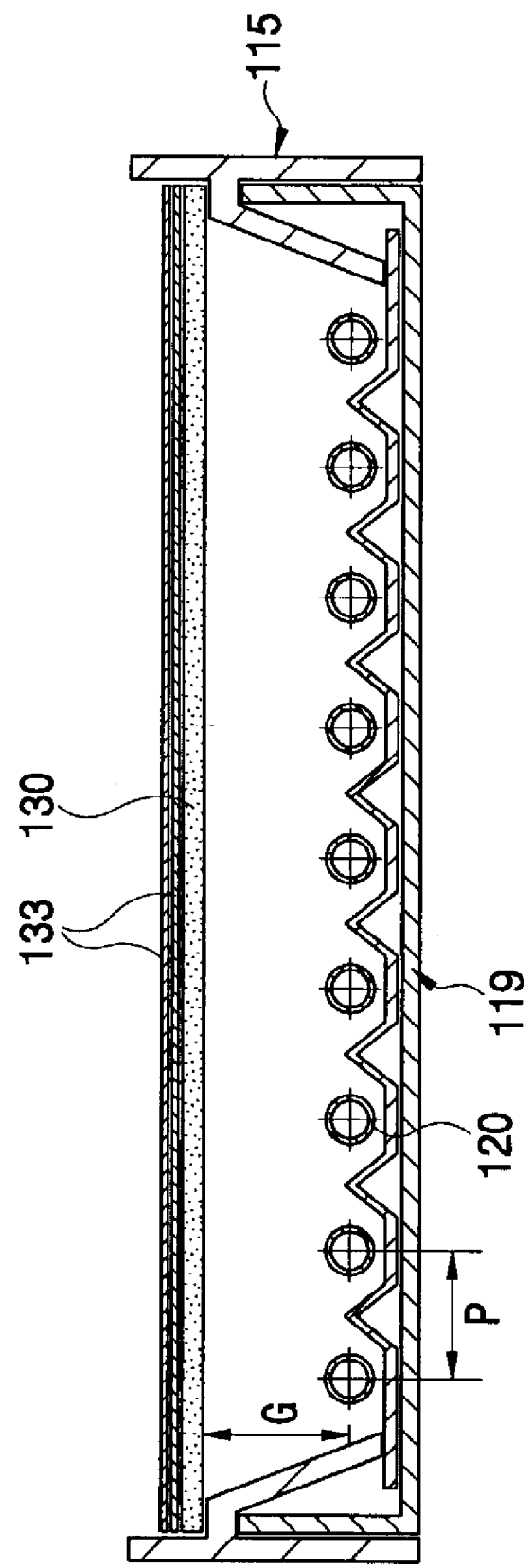
FIG. 4 is a sectional view of a backlight assembly according to a second embodiment of the present invention.

FIG. 4 is a sectional view of a backlight assembly according to a second embodiment of the present invention;

Referring to FIG. 4 and table 2, when two optical sheets 133 are added on the optical plate 130, the evaluation of the bright line is relatively better (i.e., weaker bright line) compared with the case of one optical sheet shown in table 1, and the brightness is also relatively increased.

Specifically, in case that the pitch of the lamps and the gap are adjusted to have the bright line prevention ratio of about 2.0 and the optical plate 130 and two optical sheets are used together, the bright line has an intensity that is enough at least to display images. The brightness increases by about 30% or more compared with the case that the optical plate 130 alone is used, so that the display quality is enhanced.

In case that the pitch of the lamps 120 has a constant value and the gap is adjusted to have a bright line prevention ratio of about 2.3, 1.9 or 1.7, and the optical plate 130 and two optical sheets are used together, the bright line is minimized and the brightness increases by about 30–35% compared with the case of table 1, so that the display quality is enhanced.

Accordingly, referring to tables 1 and 2, the optical sheets for enhancing the brightness may be used together with the optical plate to enhance the quality of image display.

Figure 5:
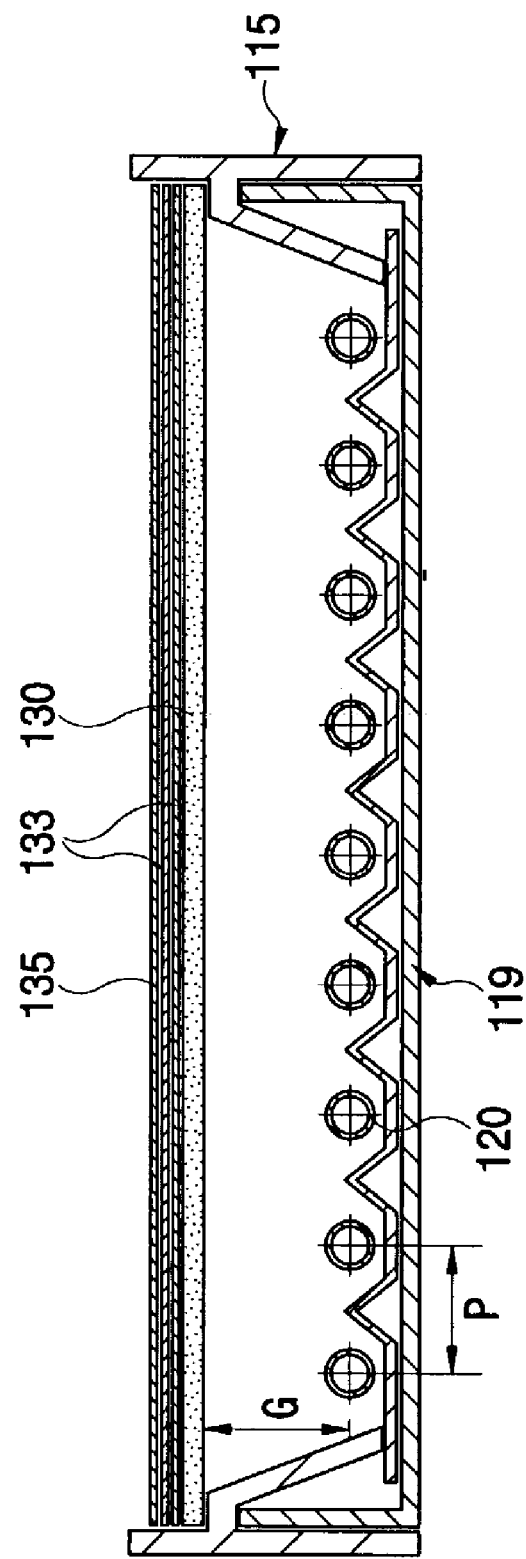
FIG. 5 is a sectional view of a backlight assembly according to a third embodiment of the present invention.

FIG. 5 is a sectional view of a backlight assembly according to a third embodiment of the present invention.

Referring to FIG. 5, a brightness-enhanced film (BEF) or a dual brightness-enhanced film (DBEF that is the trademark of a product manufactured by 3M company (Minnesota Mining and Manufacturing company, St. Paul, Minn.)) 135 may be further installed in the backlight assembly 100 when at least one optical sheet is stacked on the optical plate 130, to prevent the light from being absorbed in a lower polarizing plate of the LCD panel and to prevent the brightness from being lowered. It is noted that both the brightness-enhanced film and the dual brightness-enhanced film may be used together.

In an exemplary embodiment of the present invention shown in table 3 below, a dual brightness-enhanced film is used.

The dual brightness-enhanced film 135 prevents the light from being absorbed in the lower polarizing plate placed on the backlight assembly of the LCD device. Also, the dual brightness-enhanced film 135 reproduces light and enhances the intensity of light, and the enhanced light broadens the viewing angle of the LCD device, so that unnecessary waste of power consumption is prevented.

TABLE 3

| Trans-missivity | Constitution Of Sheet | Pitch (mm) | Gap (mm) | Pitch/ Gap | Evaluation Of Bright line | Brightness (cd/m$^2$) |
|---|---|---|---|---|---|---|
| 49% | Optical Plate + two optical sheets + DBEF | 13 13 13 13 | 4.7 5.7 6.7 7.7 | 2.8 2.3 1.9 1.7 | Δ ● ● ◉ | 7530 7200 7047 6560 |

Referring to FIG. 5 and table 3, it shows the evaluation of the bright line and the measured results of the brightness according to the variation of the bright line prevention ratio in a backlight assembly provided with an optical plate, two optical sheets and a dual brightness-enhanced film (DBEF).

The pitch between the lamps 120 is about 13 mm, and the gap increases from about 4.7 mm to about 7.7 mm at an interval of about 1 mm.

As shown in table 3, the dual brightness-enhanced film provides improvement in the evaluation of the bright line compared with the cases of tables 1 and 2. Compared with the backlight assembly provided with the optical plate and the two optical sheets, the additional use of the DBEF 135 permits the backlight assembly to have relatively high display quality even when the bright line prevention ratio is about 2.0.

Table 4 below, while the transmissivity of the optical plate 130 is increased to about 59%, shows the evaluations of the bright line and the measured results of the brightness in the backlight assemblies when only the optical plate 130 is employed, when the optical plate 130 and the two optical sheets 133 are employed, and when the optical plate, the two optical sheets and the DBEF are employed, respectively.

The pitch between the lamps 120 is about 13 mm, the gap is about 7.7 mm, and the bright line prevention ratio is about 1.7, and these conditions are the same as those of table 3 except that the transmissivity is increased to about 59%.

Tables 6 to 8 below show the evaluations of the bright line and the measured results of the brightness when the transmissivity of the optical plate is reduced from about 49% to about 41%.

TABLE 6

| Transmissivity | Constitution Of Sheet | Pitch (mm) | Gap (mm) | Pitch/Gap | Evaluation Of Bright line | Brightness (cd/m$^2$) |
|---|---|---|---|---|---|---|
| 41% | Optical Plate | 13 | 4.7 | 2.8 | x | 7520 |
|  |  | 13 | 5.7 | 2.3 | Δ | 7422 |
|  |  | 13 | 6.7 | 1.9 | Δ | 7244 |
|  |  | 13 | 7.7 | 1.7 | ● | 7077 |

TABLE 7

| Transmissivity | Constitution Of Sheet | Pitch (mm) | Gap (mm) | Pitch/Gap | Evaluation Of Bright line | Brightness (cd/m$^2$) |
|---|---|---|---|---|---|---|
| 41% | Optical Plate + two optical sheets | 13 | 4.7 | 2.8 | x | 10024 |
|  |  | 13 | 5.7 | 2.3 | Δ | 10008 |
|  |  | 13 | 6.7 | 1.9 | ● | 9741 |
|  |  | 13 | 7.7 | 1.7 | ◉ | 9426 |

TABLE 4

| Transmissivity | Constitution Of Sheet | Pitch (mm) | Gap (mm) | Pitch/Gap | Evaluation Of Bright line | Brightness (cd/m$^2$) |
|---|---|---|---|---|---|---|
| 59% | Optical plate | 13 | 7.7 | 1.7 | x | 7619 |
|  | Optical plate + two optical sheets | 13 | 7.7 | 1.7 | ● | 9959 |
|  | Optical plate + two optical sheets + DBEF | 13 | 7.7 | 1.7 | ● | 6850 |

TABLE 8

| Transmissivity | Constitution Of Sheet | Pitch (mm) | Gap (mm) | Pitch/Gap | Evaluation Of Bright line | Brightness (cd/m$^2$) |
|---|---|---|---|---|---|---|
| 41% | Optical Plate + two optical sheets + DBEF | 13 | 4.7 | 2.8 | Δ | 7640 |
|  |  | 13 | 5.7 | 2.3 | ● | 7343 |
|  |  | 13 | 6.7 | 1.9 | ● | 7037 |
|  |  | 13 | 7.7 | 1.7 | ◉ | 6869 |

Referring to table 4, according as the transmissivity of the optical plate is elevated from about 49% to about 59%, the evaluation of the bright line becomes deteriorated but the brightness is enhanced compared with those of table 3.

The backlight assemblies having such constituents shown in table 4 are especially suitable for an LCD device requiring higher brightness.

Table 5 below shows that high display quality is realized when the transmissivity is elevated from about 49% to about 59% and the bright line prevention ratio is reduced.

TABLE 5

| Transmissivity | Constitution Of Sheet | Pitch (mm) | Gap (mm) | Pitch/Gap | Evaluation Of Bright line | Brightness (cd/m$^2$) |
|---|---|---|---|---|---|---|
| 59% | Optical plate | 13 | 8.7 | 1.5 | ● | 7511 |
|  | Optical plate + two optical sheets | 13 | 8.7 | 1.5 | ● | 9800 |
|  | Optical plate + two optical sheets + DBEF | 13 | 8.7 | 1.5 | ● | 6563 |

As shown in table 5, the transmissivity is elevated from about 49% to about 59% and the bright line prevention ratios (pitch/gap) are all about 1.5.

In all the cases, the evaluation of the bright line is good (i.e., most bright lines are removed), and the brightness is enhanced. In other words, the change of the transmissivity little affects the bright line but affects the brightness.

Referring to tables 6 to 8, the experimental results show that although the transmissivity of the optical plate 130 is lowered to about 41%, the evaluation of the bright line and the brightness depend on the bright line prevention ratio which is obtained from the pitch and the gap.

Specifically, the evaluation of the bright line shows that the bright line is weakened at the bright line prevention ratio of about 2.0 so as to allow it to display a high quality image, and at the bright line prevention ratio of about 1.8–1.7 the image display quality is not influenced by the bright line.

More improvement on the evaluation of bright line may be obtained when the two diffusion sheets 133 are added to the optical plate than when only the optical plate is used. Further improvement on the evaluation of bright line may be obtained when the two diffusion sheets 133 and the dual brightness-enhanced film 135 are added to the optical plate 130 than when two diffusion sheets 133 are added to the optical plate.

Tables 9, 10 and 11 below illustrate a relation between the bright line and the brightness depending on the variation of the pitch.

Specifically, tables 9, 10 and 11 show the evaluations of the bright line and the distribution of the brightness when the pitch is increased from about 13 mm to about 18 mm and the bright line prevention ratio is gradually decreased. The transmissivity of the optical plate is about 49%.

TABLE 9

| Trans-missivity | Constitution Of Sheet | Pitch (mm) | Gap (mm) | Pitch/Gap | Evaluation Of Bright line | Brightness (cd/m²) |
|---|---|---|---|---|---|---|
| 49% | Optical Plate | 18 | 6.7 | 2.7 | x | 6899 |
| | | 18 | 7.7 | 2.3 | x | 6770 |
| | | 18 | 8.7 | 2.1 | Δ | 6583 |
| | | 18 | 9.7 | 1.9 | Δ | 6510 |
| | | 18 | 10.7 | 1.7 | ● | 6310 |
| | | 18 | 11.7 | 1.5 | ● | 6178 |

TABLE 10

| Trans-missivity | Constitution Of Sheet | Pitch (mm) | Gap (mm) | Pitch/Gap | Evaluation Of Bright line | Brightness (cd/m²) |
|---|---|---|---|---|---|---|
| 49% | Optical Plate + two diffusion sheets | 18 | 6.7 | 2.7 | x | 9594 |
| | | 18 | 7.7 | 2.3 | Δ | 9268 |
| | | 18 | 8.7 | 2.1 | ● | 8291 |
| | | 18 | 9.7 | 1.9 | ● | 8510 |
| | | 18 | 10.7 | 1.7 | ● | 8261 |
| | | 18 | 11.7 | 1.5 | ◉ | 7955 |

TABLE 11

| Trans-missivity | Constitution Of Sheet | Pitch (mm) | Gap (mm) | Pitch/Gap | Evaluation Of Bright line | Brightness (cd/m²) |
|---|---|---|---|---|---|---|
| 49% | Optical Plate + two diffusion sheets + DBEF | 18 | 6.7 | 2.7 | Δ | 6781 |
| | | 18 | 7.7 | 2.3 | Δ | 6475 |
| | | 18 | 8.7 | 2.1 | ● | 6100 |
| | | 18 | 9.7 | 1.9 | ● | 5950 |
| | | 18 | 10.7 | 1.7 | ◉ | 6200 |
| | | 18 | 11.7 | 1.5 | ◉ | 5478 |

Referring to tables 9, 10 and 11, the bright line in all the cases is weak enough to display images when the bright line prevention ratio is gradually decreased from about 2.7 to about 2.5.

In particular, when the bright line prevention ratio is in the range of about 1.8–1.7, there is significant improvement on the evaluation of bright line. In addition, the evaluation of the bright line at the bright line prevention ratio of about 1.3 is similar to that at the bright line prevention ratio of about 1.7.

Tables 9, 10 and 11 show that the bright line can be more effectively eliminated when at least one diffusion sheet is added to the optical plate or when the diffusion sheet and the dual brightness-enhanced film are added to the optical plate than when only the optical plate is used.

Tables 12, 13 and 14 below show the evaluations of the bright line and the distribution of the brightness when the pitch is increased from about 18 mm to about 23 mm and the bright line-preventive ratio is gradually decreased. The transmissivity of the optical plate is about 49% in tables 12, 13 and 14.

TABLE 12

| Transmissivity | Constitution Of Sheet | Pitch (mm) | Gap (mm) | Pitch/Gap | Evaluation Of Bright line | Brightness (cd/m²) |
|---|---|---|---|---|---|---|
| 49% | Optical Plate | 23 | 8.7 | 2.6 | x | 4100 |
| | | 23 | 9.7 | 2.4 | x | 3920 |
| | | 23 | 10.7 | 2.1 | Δ | 3780 |
| | | 23 | 11.7 | 2.0 | Δ | 3731 |
| | | 23 | 12.7 | 1.8 | ● | 3593 |

TABLE 13

| Trans-missivity | Constitution Of Sheet | Pitch (mm) | Gap (mm) | Pitch/Gap | Evaluation Of Bright line | Brightness (cd/m²) |
|---|---|---|---|---|---|---|
| 49% | Optical Plate + two diffusion sheets | 23 | 8.7 | 2.6 | x | 5410 |
| | | 23 | 9.7 | 2.4 | Δ | 5200 |
| | | 23 | 10.7 | 2.1 | Δ | 5083 |
| | | 23 | 11.7 | 2.0 | ● | 3405 |
| | | 23 | 12.7 | 1.8 | ● | 3734 |

TABLE 14

| Trans-missivity | Constitution Of Sheet | Pitch (mm) | Gap (mm) | Pitch/Gap | Evaluation Of Bright line | Brightness (cd/m²) |
|---|---|---|---|---|---|---|
| 49% | Optical Plate + two diffusion sheets + DBEF | 23 | 8.7 | 2.6 | x | 3839 |
| | | 23 | 9.7 | 2.4 | Δ | 3681 |
| | | 23 | 10.7 | 2.1 | ● | 5483 |
| | | 23 | 11.7 | 2.0 | ● | 3405 |
| | | 23 | 12.7 | 1.8 | ● | 3977 |

Referring to tables 12, 13 and 14, the bright line in all the cases is weak enough to display images when the pitch is increased from about 18 mm to about 23 mm and the bright line prevention ratio is gradually decreased from about 2.6 to about 1.8. Especially, when the bright line prevention ratio is decreased to a value of about 1.8 or less, the problems due to the bright line are mostly eliminated and the brightness is maximized.

The bright line can be more effectively eliminated to display high quality images when two diffusion sheets are added to the optical plate or when two diffusion sheets and the dual brightness-enhanced film are added to the optical plate than when only the optical plate is used.

Tables 1 to 14 show the results measured when a bright line prevention pattern for reducing the bright line is not formed in the optical plate. When a bright line prevention pattern for reducing the bright line is formed, the display quality may be further improved.

Figure 6:
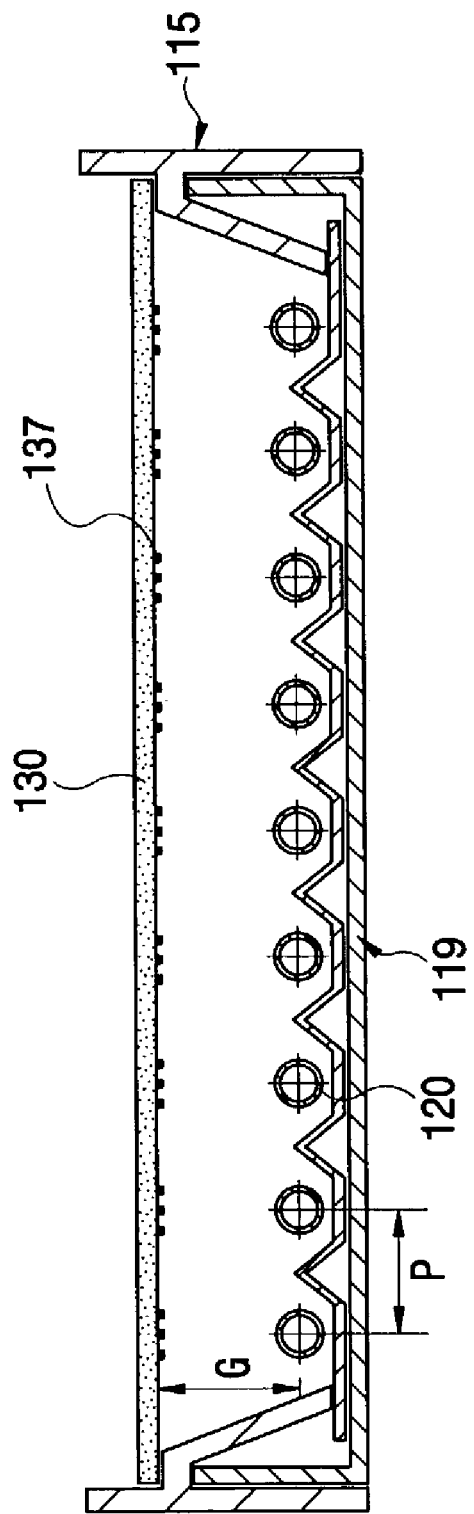
FIG. 6 is a sectional view of a backlight assembly according to a fourth embodiment of the present invention.

FIG. 6 is a sectional view of a backlight assembly in which a bright line prevention pattern is formed in an optical plate facing the lamps according to a fourth embodiment of the present invention.

Referring to FIG. 6, the bright line prevention pattern 137 diffuses the light that is arrived at the optical plate 130. Considering the results of tables 1 to 14, it is desirable to adjust the bright line prevention ratio in the range of about 2.3–1.7 while the bright line prevention pattern is installed.

Figure 7:
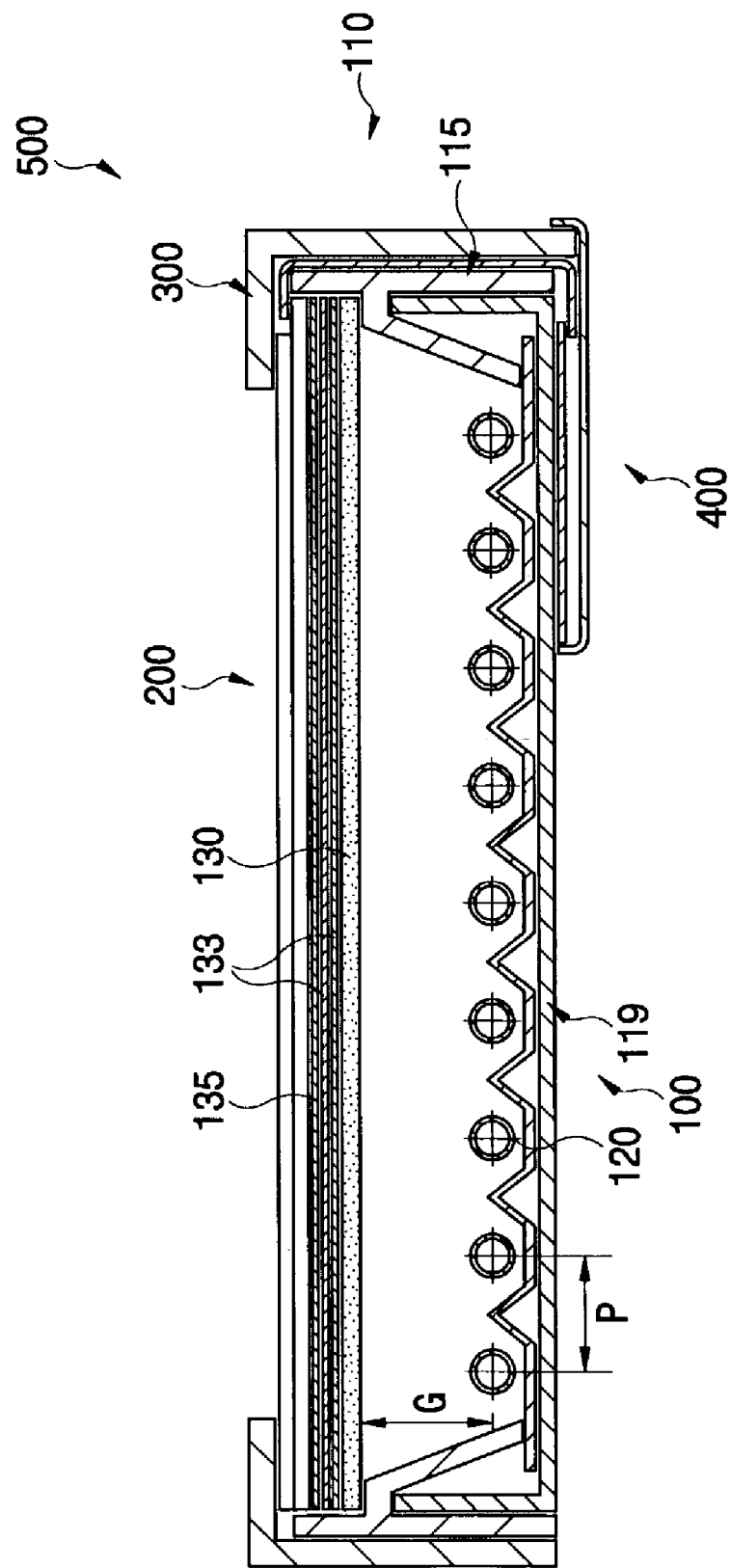
FIG. 7 is a sectional view of an LCD device according to an embodiment of the present invention.

FIG. 7 is a sectional view of an LCD device according to an embodiment of the present invention.

Referring to FIG. 7, an LCD device 500 includes a backlight assembly 100, an LCD panel assembly 200 and a chassis 300. The reference numeral 400 represents a back cover.

As described previously in detail referring to FIG. 1 through FIG. 5, the backlight assembly 100 includes a receiving container 110 having a receiving frame 115 and a bottom chassis 119, lamps 120, an optical plate 130 and an optical sheet 133.

The ratio of pitch (P) to gap (G), i.e., the bright line prevention ratio (pitch/gap) is in a range of about 1.3–2.0. When the bright line prevention ratio is in the range of about 1.3–2.0, the bright line is reduced so as to be little perceived by a user.

In the following drawings, the same reference numbers will be used to refer to the same or like parts as those shown in the previous drawings, FIGS. 1 to 6.

The LCD panel assembly 200 is received in the receiving container 110 of the backlight assembly 100.

Here, the optical plate 130, two diffusion sheets 133 and one sheet of dual brightness-enhanced film 135 are interposingly installed between the LCD panel assembly 200 and the lamps 120 received in the receiving container 110.

Figure 8:
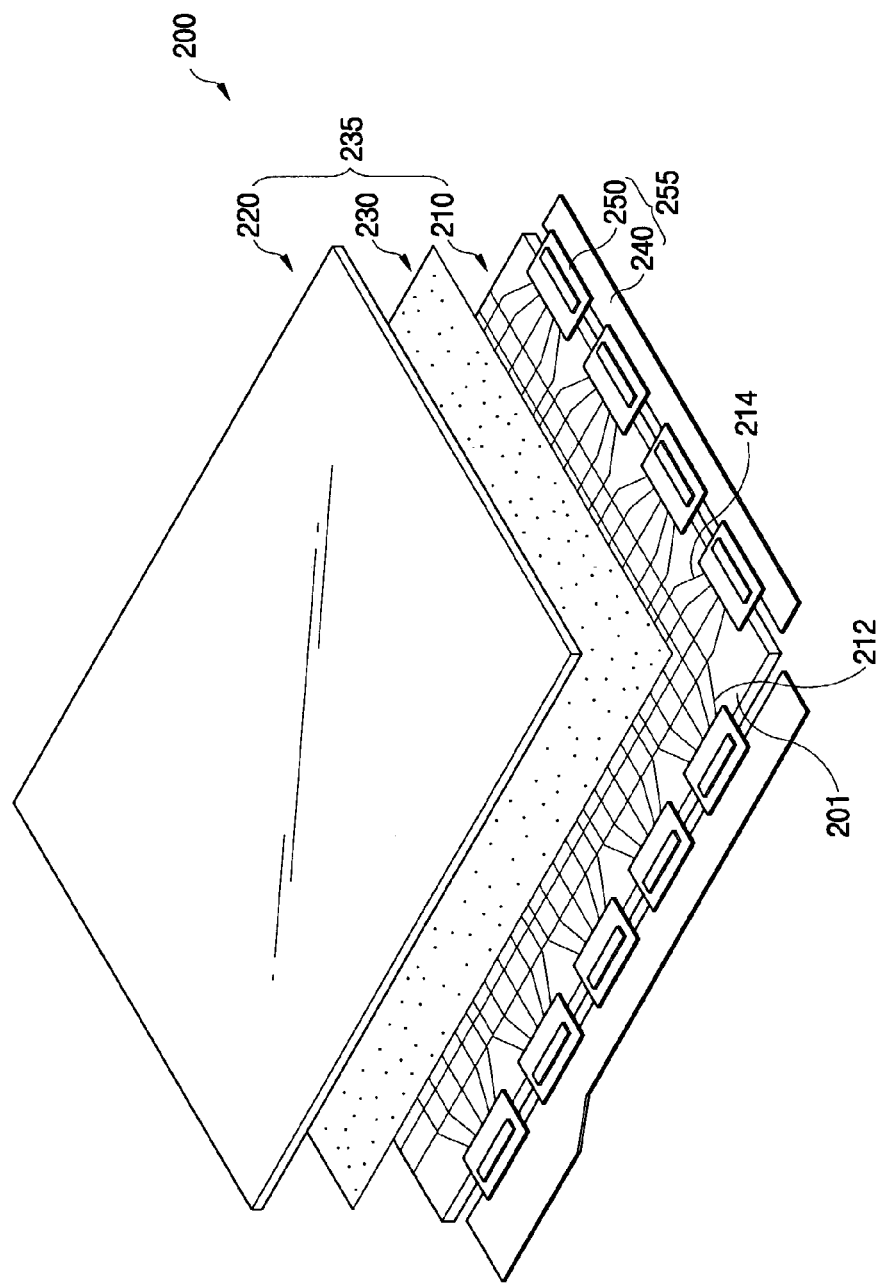
FIG. 8 is an exploded perspective view of an LCD panel assembly of the LCD device in FIG. 7.

FIG. 8 is an exploded perspective view of an LCD panel assembly according to an embodiment of the present invention.

Referring to FIG. 8, the LCD panel assembly 200 includes an LCD panel 235 and a driving module 255. The LCD panel 235 includes a TFT substrate 210, a liquid crystal layer 230 and a color filter substrate 220. The TFT substrate 210 includes a glass substrate 201, thin film transistors (TFTs) 218 and pixel electrodes 216.

Figure 9:
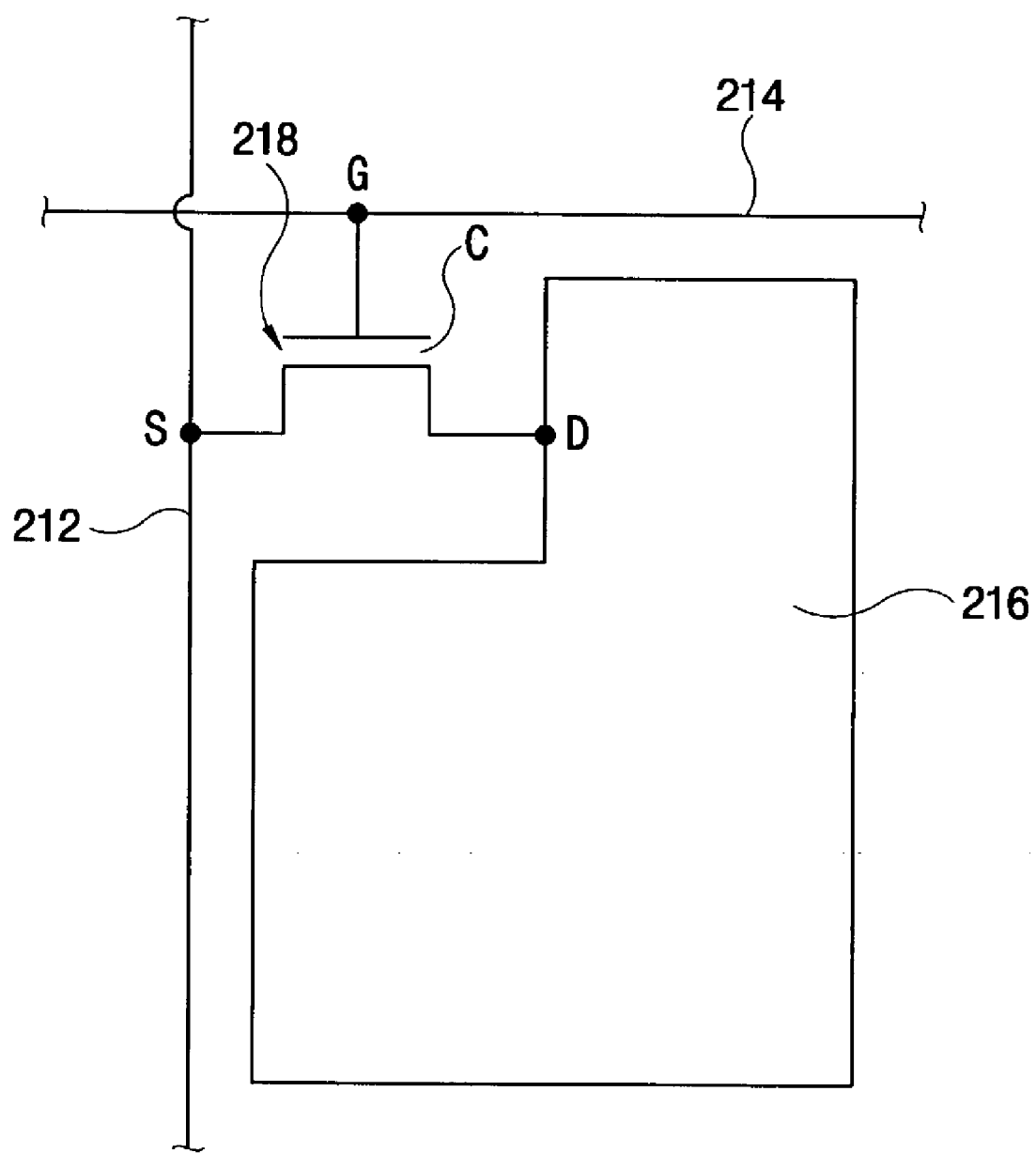
FIG. 9 is a schematic view for showing a thin film transistor and a pixel electrode of the LCD panel in FIG. 8.

FIG. 9 is a schematic view for showing a thin film transistor and a pixel electrode of the LCD panel according to an embodiment of the present invention.

The TFTs 218 are formed on the glass substrate 201 by a thin film process for a semiconductor device to be arranged in a matrix shape. Referring to FIG. 9, each of the TFTs 218 includes a gate electrode (G), a drain electrode (D), a source electrode (S) and a channel layer (C). The gate electrode (G) is connected to a gate line 214 and the source electrode (S) is connected to a data line 212. The drain electrode (D) of each of the TFTs 218 is connected to a corresponding pixel electrode 216. The pixel electrode 216 is made of transparent conductor of indium tin oxide (ITO) or indium zinc oxide (IZO).

Figure 10:
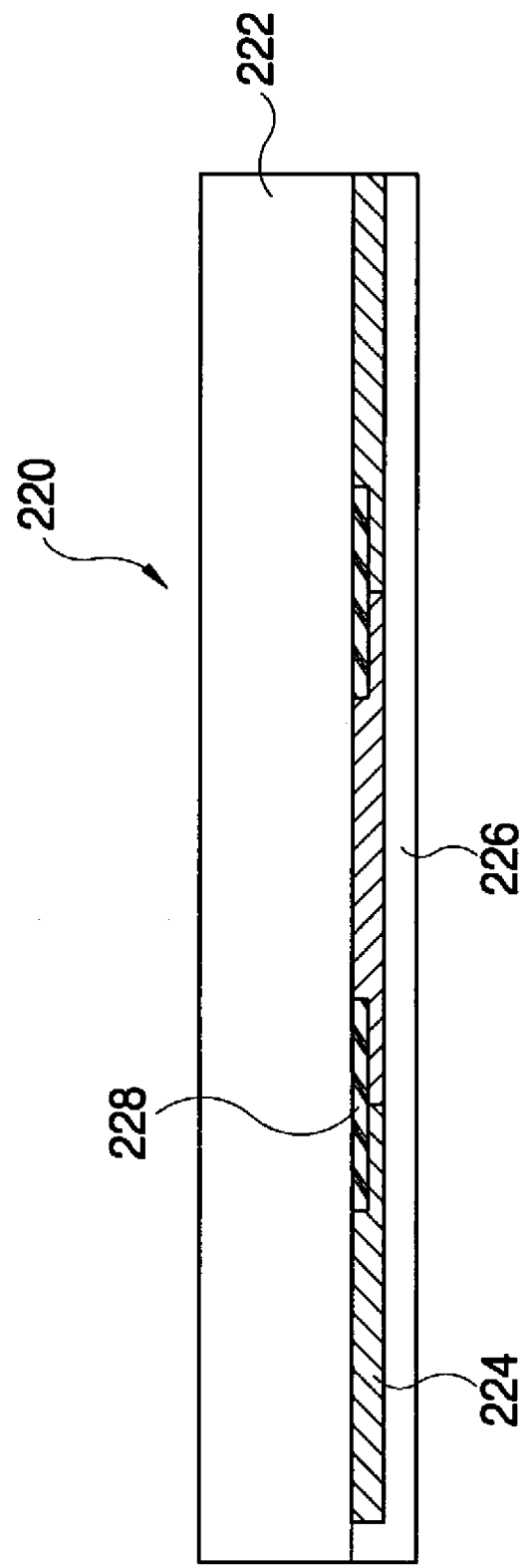
FIG. 10 is a sectional view of the color filter substrate in FIG. 8.

FIG. 10 is a sectional view of a color filter substrate according to an embodiment of the present invention.

Referring to FIG. 10, the color filter substrate 220 is coupled with the TFT substrate 210. The color filter substrate 220 includes a glass substrate 222, color filters 224, black matrixes 228 and a common electrode 226. The color filters 224 are formed to face the pixel electrode 216 of the TFT substrate 210, and consist of red color filter, green color filter and blue color filter so as to realize a full color display. The black matrixes 228 are formed between the color filters 224 and prevent light from being leaked to an area where the liquid crystal molecules cannot be controlled. The common electrode 226 is formed on the entire surface of the glass substrate 222 to cover the color filters 224, and allows a predetermined electric field to be formed at the liquid crystal when electric power is applied to the pixel electrode 216.

The driving module 255 (referring to FIG. 8) is connected to the LCD panel 235 having the above structure. The driving module 255 includes a printed circuit board (PCB) 240 and a tape carrier package (TCP) 250. The TCP 250 includes a first end connected to the gate line 214 and the data line 212 and a second end facing the first end and being connected to the PCB 240.

Referring again to FIG. 7, the LCD panel assembly 200 having the aforementioned structure is received in the receiving container 110 of the backlight assembly 100. The chassis 300 encloses edge portions of the LCD panel assembly 200 received in the backlight assembly 100 such that the LCD panel assembly 200 is not deviated from the backlight assembly 100. Accordingly, the chassis 300 prevents the fragile LCD panel from being broken by an external impact.

As described above, the ratio of the pitch which is the interval between the lamps for supplying light to the LCD panel, to the gap which is a distance between the center of the lamps and the optical plate, is adjusted to thereby minimize the bright line that badly influences the image display quality, so as to display a high quality image.

Although in the embodiments of the present invention the bright line prevention ratio is set as low as about 1.5, the bright line prevention ratio may be lowered to about 1.3. Also, the transmissivity of the optical plate varies between about 41% and about 59% in the exemplary embodiments of the present invention, the transmissivity may be extended to a range of about 35–65%.

While the present invention and its advantages have been described in detail, it should be understood that various changes, substitutions and alterations can be made herein without departing from the spirit and scope of the invention as defined by appended claims.

What is claimed is:

1. A backlight assembly comprising:
   a receiving container;
   at least two lamps disposed in the receiving container; and
   an optical plate for enhancing brightness uniformity of light generated from the lamps,
   wherein the backlight assembly has a bright line prevention ratio of a pitch to a gap, the pitch being a distance between centers of two adjacent lamps, the gap being a distance between a center of the respective lamps and a surface of the optical plate, and the bright line prevention ratio being in the range from about 1.3 to about 2.0 to prevent a bright line generated from the lamps from being perceived outside the optical plate.

2. The backlight assembly of claim 1, wherein the bright line prevention ratio is in the range from about 1.7 to about 1.8.

3. The backlight assembly of claim 1, wherein the optical plate has a transmissivity in the range from about 35% to about 65%.

4. The backlight assembly of claim 1, further comprising an optical sheet formed at an outer surface of the optical plate so as to further enhance the brightness uniformity.

5. The backlight assembly of claim 4, further comprising a brightness-enhanced film formed at the outer surface so as to reproduce light diffused by the optical sheet to increase usage efficiency of the light.

6. A backlight assembly comprising:
   a receiving container;
   at least two lamps disposed in the receiving container;
   a diffusion plate for diffusing light generated from the lamps the diffusion plate having first portions corresponding to the lamps and a second pation corresponding to an area between the lamps; and
   a diffusion pattern formed at the first portion,
   wherein the backlight assembly has a bright line prevention ratio of a pitch to a gap, the ratio being in the range from about 1.3 to about 2.8 to prevent a bright line generated from the lamp from being perceived outside the diffusion plate, the pitch being a distance between centers of two adjacent-lamps and the gap being a distance between a center of the respective lamps and a surface of the diffusion plate.

7. The backlight assembly of claim 6, wherein the diffusion plate has a transmissivity in the range from about 35% to about 65%.

8. The backlight assembly of claim 6, further comprising a diffusion sheet formed at an outer surface of the diffusion plate so as to further enhance the brightness of the light.

9. The backlight assembly of claim 8, further comprising a brightness-enhanced film formed at the outer surface so as to reproduce light diffused by the diffusion sheet to increase usage efficiency of the light.

10. A liquid crystal display device comprising:
a backlight assembly including:
   a receiving container;
   at least two lamps disposed in the receiving container, for generating a first light; and
   an optical plate being apart from centers of the lamps, for diffusing the first light to generate a second light having a uniform brightness distribution, wherein the backlight assembly has a bright line prevention ratio of a pitch to a gap, the pitch being a distance between centers of two adjacent lamps, the gap being a distance between a center of the respective lamps and a surface of the optical plate, and the bright line prevention ratio being in the range from about 1.3 to about 2.8 to prevent a bright line of the first light from being perceived outside the optical plate;
a liquid crystal display panel assembly received in the receiving container, for displaying images using a second light diffused by the optical plate; and
a chassis for fixing the liquid crystal display panel assembly to the receiving container.

11. The liquid crystal display device of claim 10, wherein the bright line prevention ratio is in the range from about 1.7 to about 1.8.

12. The liquid crystal display device of claim 10, further comprising a diffusion pattern for diffusing the first light, wherein the optical plate has first portions corresponding to the lamps and second portions corresponding to an area between the lamps and the diffusion pattern is formed at the first portions of the optical plate.

13. The liquid crystal display device of claim 12, wherein the bright line prevention ratio is in the range from about 2.3 to about 1.7.

14. The liquid crystal display device of claim 10, wherein the optical plate has a transmissivity in the range from about 35% to about 65%.

15. The liquid crystal display device of claim 10, further comprising an optical sheet disposed between the optical plate and the liquid crystal display panel assembly.

16. The liquid crystal display device of claim 15, further comprising a brightness-enhanced film formed on the optical sheet, the brightness-enhanced film reproducing a third light diffused by the optical sheet to increase usage efficiency of the light.

17. The liquid crystal display device of claim 10, wherein the pitch is in the range from about 13 mm to about 23 mm.

* * * * *